(12) United States Patent
Kampel (10) Patent No.: US 7,397,366 B2
(45) Date of Patent: Jul. 8, 2008

(54) METHOD AND APPARATUS FOR LOCATING A PERSON WHO HAS BEEN BURIED ALIVE

(76) Inventor: Gerald Kampel, Hainbuchenstr. 67, Taufkirchen (DE)

( * ) Notice: Subject to any disclaimer, the term of this patent is extended or adjusted under 35 U.S.C. 154(b) by 226 days.

(21) Appl. No.: 11/457,896

(22) Filed: Jul. 17, 2006

(65) Prior Publication Data

US 2007/0013525 A1 Jan. 18, 2007

(30) Foreign Application Priority Data

Jul. 18, 2005 (EP) .................................. 05015558

(51) Int. Cl.
*G08B 1/08* (2006.01)
*H04Q 7/00* (2006.01)
(52) U.S. Cl. ............................ 340/539.13; 340/539.32; 340/573.4; 340/539.15; 324/326; 324/327; 324/328; 324/329; 342/146
(58) Field of Classification Search ............ 340/539.13, 340/539.32, 573.4, 539.15; 324/326, 327, 324/328, 329; 342/146
See application file for complete search history.

(56) References Cited

U.S. PATENT DOCUMENTS

| | | | | |
|---|---|---|---|---|
| 4,850,031 | A * | 7/1989 | Allsop et al. ................ | 455/500 |
| 5,955,982 | A | 9/1999 | Moulin | |
| 6,097,189 | A * | 8/2000 | Arndt et al. ................ | 324/326 |
| 6,246,863 | B1 | 6/2001 | Kampel | |
| 6,484,021 | B1 | 11/2002 | Hereford et al. | |
| 6,960,996 | B2 * | 11/2005 | Sackl ..................... | 340/539.11 |
| 7,148,801 | B2 * | 12/2006 | Crabtree et al. ........ | 340/539.13 |
| 2003/0218539 | A1 * | 11/2003 | Hight .................... | 340/539.13 |
| 2005/0007251 | A1 * | 1/2005 | Crabtree et al. ........ | 340/539.13 |
| 2005/0231359 | A1 | 10/2005 | Kampel et al. | |
| 2005/0253707 | A1 * | 11/2005 | Clarke et al. ........... | 340/539.15 |
| 2006/0035622 | A1 | 2/2006 | Kampel et al. | |
| 2006/0176178 | A1 * | 8/2006 | Everest et al. ............ | 340/572.1 |
| 2007/0052534 | A1 * | 3/2007 | Bird et al. .............. | 340/539.13 |

FOREIGN PATENT DOCUMENTS

DE 3531726 A1 3/1987

* cited by examiner

*Primary Examiner*—Jeff Hofsass
*Assistant Examiner*—Jack Wang
(74) *Attorney, Agent, or Firm*—Michael J. Weins; Jeffrey E. Semplebon (57) ABSTRACT

A search apparatus and related method facilitate the final stage of a search for a buried person carrying a transmitter. When the searcher is in the close vicinity of the buried transmitter, the search enters a point-localization phase where the apparatus displays a representation of the current target distance from the apparatus to the buried transmitter as well as a representation of a previously-stored value for the target distance. By comparing the current distance to the previously-stored distance, the searcher can readily see whether the apparatus is getting closer to the buried transmitter or further away. Preferably, graphic symbols are displayed to represent the current distance and the previously-stored distance. The display can also provide a representation of whether the current distance is greater than or less than an immediately preceding distance that has been stored.

19 Claims, 6 Drawing Sheets

METHOD AND APPARATUS FOR LOCATING A PERSON WHO HAS BEEN BURIED ALIVE

This application claims priority of European Application No. 05015558, filed Jul. 18, 2005.

FIELD OF THE INVENTION

The present invention relates to a method and to an apparatus for locating a person who has been buried while alive, in particular one who has been covered in snow by an avalanche.

BACKGROUND OF THE INVENTION

A method of finding such buried people, which has become standard in particular for locating avalanche victims, is to search according to the transmitter-receiver principle. That is, a wireless transmitter carried by the buried person sends out signals that are received by a searcher, or a group of searchers, by means of a wireless receiver. To achieve a high degree of compatibility between an arbitrary number of transmitters and receivers, a standardized signal characteristic is employed. In the case of avalanche searches, for example, a frequency of 457 kHz is used.

The wireless receivers have available one or more antennae with a pronounced directional characteristic, and can be used to take a bearing on the site of origin of the signals, and thus to locate the position of the buried person.

The manufacturers of such wireless transmitters and/or receivers are continually developing these devices in order to make it easier to find one or more such buried persons. This is particularly important because the rescuers who operate the wireless receivers are under extreme stress: every second spent in locating the target can crucially determine whether the person or persons involved will live or die. One study, for example, has shown that the probability that a person caught in an avalanche will survive that experience decreases rapidly only 15 minutes after the event. Hence, modern wireless receivers employ display devices (cf. the document DE 35 31 726 C2) that additionally display the momentary strength of a signal received from a particular direction. This information can be represented, for example, in the form of data explicitly stating the distance between transmitter and receiver.

In practice, it has been found that the so-called last meters are often the most difficult stage in the search for a buried person. In this phase of "point localization", the received information specifying a particular direction can often play only a very minor role, or can even be misleading because the searcher may well already be standing above the buried person. Distance data are also often erroneous in this stage, and exhibit only minimal differences.

SUMMARY OF THE INVENTION

The present invention is thus intended to provide a method and an apparatus for locating a buried person that facilitates the search during the last meters and thus shortens the time until the person is found.

The method of the present invention for locating a buried person, in particular one buried by an avalanche, employs a wireless receiver with a directional characteristic and comprises the steps discussed below.

At the beginning of the search, criteria are set for the signal strength conditions which determine whether the search should proceed in a search phase or in a point-localization phase. These criteria are related to the distance between the receiver and a transmitter carried by the buried person, which is calculated from the nature of the received signal, and in particular on the signal strength. The criteria is typically represented as a threshold value for distance, defined hereinafter as d1.

The wireless receiver receives the signals that have been emitted by the wireless transmitter carried by the buried person.

The received signals are then processed to derive current locality information, such locality information including at least the current distance between the receiver and the transmitter, hereinafter defined as the current target distance d.

A determination is then made, based on the strength of the processed signal, whether to operate in the search phase or in the point-localization phase. If the received signal has a strength corresponding to a current target distance that is greater than the threshold distance d1, the search phase is implemented, and if the strength is less than the strength corresponding to the threshold distance d1, the point-localization phase is implemented.

In the search phase, information regarding the current distance of the buried person is displayed. If additional current locality information, such as a current direction from the receiver to the buried transmitter has been determined, this information may also be displayed in the search phase.

In the point-localization phase, the current target distance d is stored in memory. A representation of the current distance is displayed. Additionally, if at least one previously-stored value for current distance is available in the memory, a comparison of the current target distance with at least one of the stored values is made, and a symbolic comparison of the current target distance to the previously-stored distance is also displayed, indicating the change in the current distance from the previous distance. The previously stored distance used for comparison could be the most recently stored distance and/or could be the smallest of the stored distances. It is typically convenient to store initial default values for the distance to be used for comparison when the point-localization phase is first initiated.

In either phase of the search, once the current target distance is displayed, the receiver again receives the signal from the buried transmitter, the signal is processed to determine the new current target distance, and information including an indication of the current distance is displayed.

The advantage of this method resides in the fact that, in the search phase, spatial information is displayed in a manner already known, e.g.: information about the distance between searcher and buried person (hereinafter termed "target distance") and the direction in which that person is located ("target direction"). Then, in the point-localization phase, in addition to the acquisition and display of current spatial information, there is storage and preferably display of at least some of the previously acquired spatial information, in particular some representation of one or more of the stored target distances. This representation can be a direct representation of the stored target distance, which can be visually compared to the current target distance by the searcher, or can represent a comparison of the current target distance to the stored target distance. Having this information displayed allows the searcher or searchers an opportunity during the point-localization phase to compare past and present spatial information with one another, and thus can achieve better results in locating the buried person and can save him or her more quickly.

It should be noted that, in the point-localization phase, the at least one stored target distance and the current target distance can be the same. Therefore, when both distances are the same, the displayed items of spatial information can overlap one another.

The determination of whether the search operates in the search phase or in the point-localization phase should be made based on the distance to the buried transmitter, as indicated by the received signals. The threshold distance value d1 is defined, which is the distance at which the operation should switch from one phase to another. The signals from the receiver are processed to obtain a current target distance d representing the current distance from the receiver to the buried transmitter, and the current target distance d is compared to the predetermined threshold distance d1. If d is greater than d1, indicating that the searcher is a substantial distance from the buried transmitter, the search is conducted in the search phase. When the current target distance d becomes less than the threshold distance d1, indicating that the searcher is in close proximity to the buried transmitter, then the search should be conducted in the point-localization phase.

Since the target distance from the buried transmitter is typically determined based on received signal strength, it is advantageous for the change from one phase to another to take place automatically as a function of the strength of the received signals. For instance, it is particularly convenient for the searchers if the change from search phase to point-localization phase and/or back occurs as soon as a strength of one of the received signals exceeds or falls below, respectively, a prespecified threshold, the received signal strength corresponding to the current target distance d and the threshold corresponding to a predetermined threshold distance d1. Thus, signal strength criteria could be substituted for distance criteria when determining the appropriate phase of operation. That is, the searcher is not responsible for deciding when it is advantageous to search in the point-localization phase or in the search phase.

Generally, the target distance is determined based on the received signals, in particular their intensity. For example, the amplitude of the received signals can be informative regarding the distance between wireless transmitter and wireless receiver.

Finding the buried person is additionally facilitated when the display in the point-localization phase includes at least one graphic symbol. Because, as described above, this localization process is always an extreme situation for the searchers, a pictorial representation of important information helps the searchers to master the situation and avoid errors. This graphic representation can be purely symbolic or can comprise a mixture of symbols plus numerical values and/or letters.

Preferably for the point-location phase, this display comprises at least one first graphic symbol to indicate the current target distance and at least one second graphic symbol to provide a symbolic comparison between the current target distance and at least one stored target distance. If these symbols are clearly distinguishable, the information displayed to the searcher is easier to understand. This differential representation can be achieved, for example, by presenting the same symbols differently or by using different symbols. For the different presentation of identical symbols it is conceivable, for example, to make one of them blinking and/or thicker or larger and/or a different color than the other.

In one preferred embodiment, at least one of the first graphic symbols consists of a distance circle or parts of a distance circle with a radius that is related to the current target distance. In this connection at least one of the second graphic symbols also preferably consists of a distance circle or parts of a distance circle with a radius related to a stored target distance. By means of these circles, the current and at least one additional target distance are indicated in a simple and very versatile way. Preferably, the centers of the distance circles substantially coincide with one another. Thus, the searcher can see at a glance whether he is moving in the direction of the buried person (smaller one of the distance circles) or away from the buried person (larger one of the distance circles).

In another preferred method, the point-localization phase includes a repeated determination and display of the stored target distance that corresponds to the smallest of the stored target distances defined herein as dmin. The value of dmin for the first instance of the point-localization phase is preferably set to be the same as the cross-over distance d1 at which the search apparatus switches from the search phase to the point-localization phase. That is, as soon as the point-localization phase begins, the searcher continually sees a display of the current target distance as well as at least the target distance corresponding to the smallest distance he has ever been from the buried person. By comparing these two quantities or symbols, the searcher can evaluate how the search is progressing. It should be noted that, if the searcher is continuously approaching the buried transmitter in this method, the current target distance will also be the smallest distance, and thus a display of only the current target distance will serve to represent both the current distance and the fact that it is the smallest distance of those stored in memory. In this method, display of two separate representations, one for the current distance and one for the smallest distance, provides a clear indication to the searcher that the current distance is greater than the smallest, which occurs when the searcher begins to move away from the buried transmitter.

Preferably, the point-localization phase also comprises a display representing a tendency, which is determined by comparing stored target distances with the current target distance. In this comparison it will preferably be a previous, recently-stored target distance that is compared with the current target distance, and it is further preferred for the most recently stored target distance to be used for comparison. Thus, if the current target distance is greater than the recent previously-stored target distances, this tendency indicates that the apparatus is moving away from the buried person. If the current target distance is less than the recent previously-stored target distance, this tendency indicates that the apparatus is moving closer to the buried person, even though the current target distance may still be greater than the smallest of the stored target distances (dmin). It is especially user-friendly for a tendency to be displayed when the searcher is moving away from the buried person (i.e., the target distance is increasing). To display the tendency resulting from movement of the apparatus either toward or away from the buried person, tendency arrows can be used. When the target distance is represented by circles with a common center, the preferred way to display the tendency is by arrows that point away from the center when the target distance is increasing, and towards the center when the target distance is becoming smaller.

In the point localization phase, it is also preferred to compare the current target distance with a predefined minimum target distance d2, representing the distance at which the searcher is in such close proximity that they should begin digging or using a probe to locate the buried person. When the current target distance is less than the minimum target distance d2, the display should provide an indication of this situation.

Preferably, the stored target distances are automatically deleted when a change is made from the point-localization phase to the search phase. When the stored target distances are deleted, the value of any stored distances used for comparison, such as the smallest stored distance dmin, are reset to their initial, default values. Means could also be provided to enable manual deletion.

Since the proximity to the buried person is so small in the point-localization phase, it may be advantageous for the searcher to stand while moving the search apparatus back and forth with an arm, holding the search apparatus straight so as to remain substantially parallel to the ground and with the wrist rigid so that the search apparatus acts as an extension of the arm. When operated in this mode, the apparatus, not the searcher, will be moving toward or away from the buried person.

A search apparatus of the present invention is designed to implement the above method for searching for people buried by an avalanche. The search apparatus has a receiver for receiving signals that have been transmitted by a transmitter carried by a buried person. The receiver is sensitive to the direction of the signals being received.

A processing device is provided for processing the received signals in order to acquire current locality information, including calculation of a current distance to the buried transmitter, the current target distance d. The directional sensitivity of the receiver allows accurate calculation of the current target distance in the manner known in the art. The current locality information calculated values could also include an indication of the direction from the receiver to the buried transmitter.

A display device is provided on the apparatus for displaying the locality information. The display device is suitable for presenting an indication of the current target distance to the searcher, and additional information may be presented according to the phase of the search, as discussed below.

A storage device with an addressable memory is provided for storing the current target distance and one or more previous values for target distance. Preferably, the addressable memory of the storage device has the capacity to accommodate at least the smallest distance, dmin, and the data needed for determining a symbolic comparison of current distance d1 to at least one recently determined prior distance.

A control means drives the display device, and a discrimination means is provided that discriminates between the search phase and the point-localization phase so that the control means provides an appropriate display for the current phase of operation. The control means drives the display such that, during the point-localization phase, the current target distance and a symbolic comparison of the current target distance to at least one stored, previous target distance are represented on the display device.

In a preferred embodiment, the control means has means for determining a tendency for providing a comparison of the current target distance to an immediately preceding target distance, the control means then causing the display means to symbolically display the tendency, as discussed in greater detail above with regard to the method.

DETAILED DESCRIPTION OF THE PREFERRED EMBODIMENTS

Figure 1:
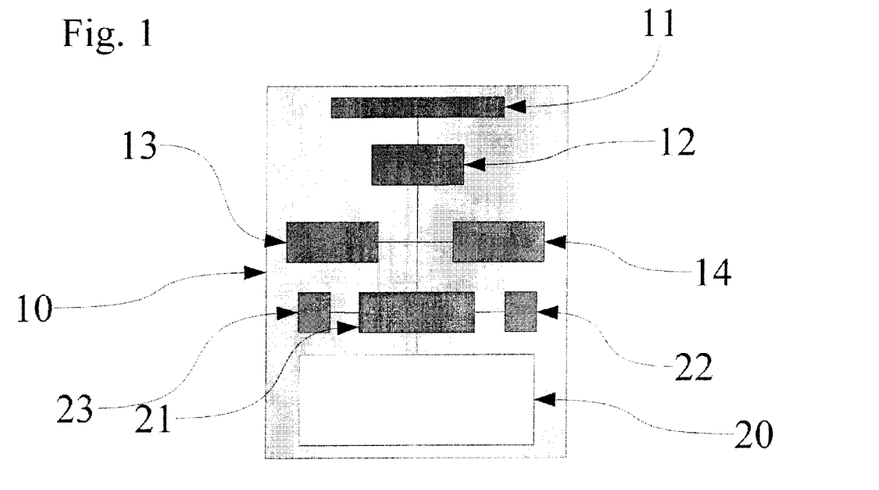
FIG. 1 is a diagram of an exemplary embodiment of an appliance with which to search for people buried by avalanches, with a display device.

FIG. 1 is a schematic representation of an embodiment of an apparatus of the present invention which serves to locate a person who has been buried alive. In particular, this drawing represents a search appliance 10 for locating people buried by avalanches. This search appliance 10 has a display device 20 for displaying at least one item of locality information which aids a user of the search appliance 10 in finding the buried person. The search appliance 10 also has a receiver 11 with a directional characteristic to receive signals transmitted from a transmitter (not shown) carried by a buried person. A processing device 12 is provided for analyzing the received signals and determining from the signals current locality information, including at least a current target distance and preferably the directionality of the signal with respect to the search appliance 10. A control means 21 drives the display device 20, which presents information relating to the location of the buried person with respect to the search appliance 10. The search appliance 10 also has a storage device 13 having an addressable memory for storing at least one previously acquired item of locality information in memory. The memory preferably has the capacity to store at least the current target distance, the smallest target distance observed to date, and data needed to establish a symbolic comparison of the current target distance to a recent prior observed distance. The search appliance 10 also has a deletion device 14 for deleting at least one previously acquired item of locality information. The deletion device 14 may take the form of hardware, and be operated manually, or alternatively, and preferably, is automatically operated with software. When software is employed, one can delete previous data by reinitializing the storage location containing the data. The search appliance 10 is provided with a discrimination means 22 that analyzes signal strength with respect to a predetermined threshold value and, based on this analysis, the search appliance 10 enters a search phase or a point-localization phase, processing the received signals according to the phase in which the search appliance 10 is operating and providing an appropriate display according to the phase in which the search is being conducted. It is preferred to incorporate an actuation device 23 with which to manually input commands such as turning the search appliance 10 on or off.

The display device 20 shows representations of locality information such as can be seen in FIGS. 2-9. The display device 20 can also, when appropriate software is provided for the search appliance 10, show additional information, such as a current temperature, a current altitude, a time of day, a search time, current battery condition, or any other information that may be desired.

The search appliance 10 shown in FIG. 1 can operate in either a search phase or in a point-localization phase, and the discrimination means 22 determines which phase is appropriate at any given time. The search phase is suitable for determining the approximate position of the buried person, while the point-localization phase serves to specify the exact position of the buried person. The determination of which phase the search appliance 10 operates in is discussed below and, in particular, with regard the discussion of FIGS. 10 and 11.

Figure 2:
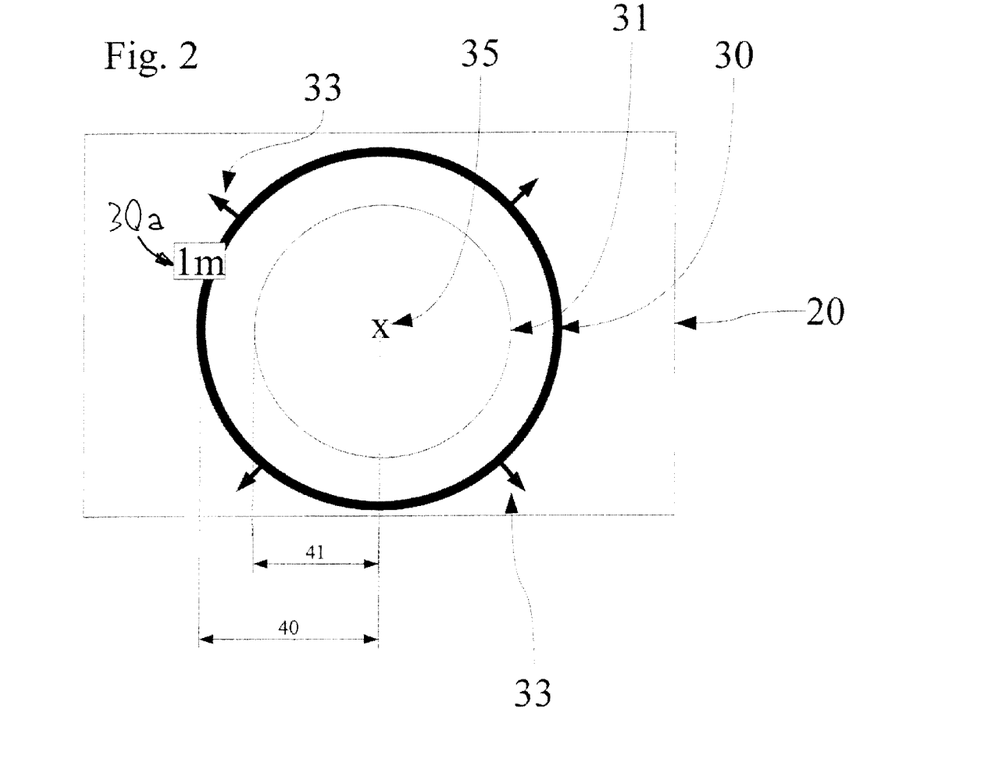
FIG. 2 shows a first way to represent locality information for display in the display device of FIG. 1, where the search apparatus is in a point-localization phase of operation and the apparatus is moving further away from a buried transmitter.
Figure 3:
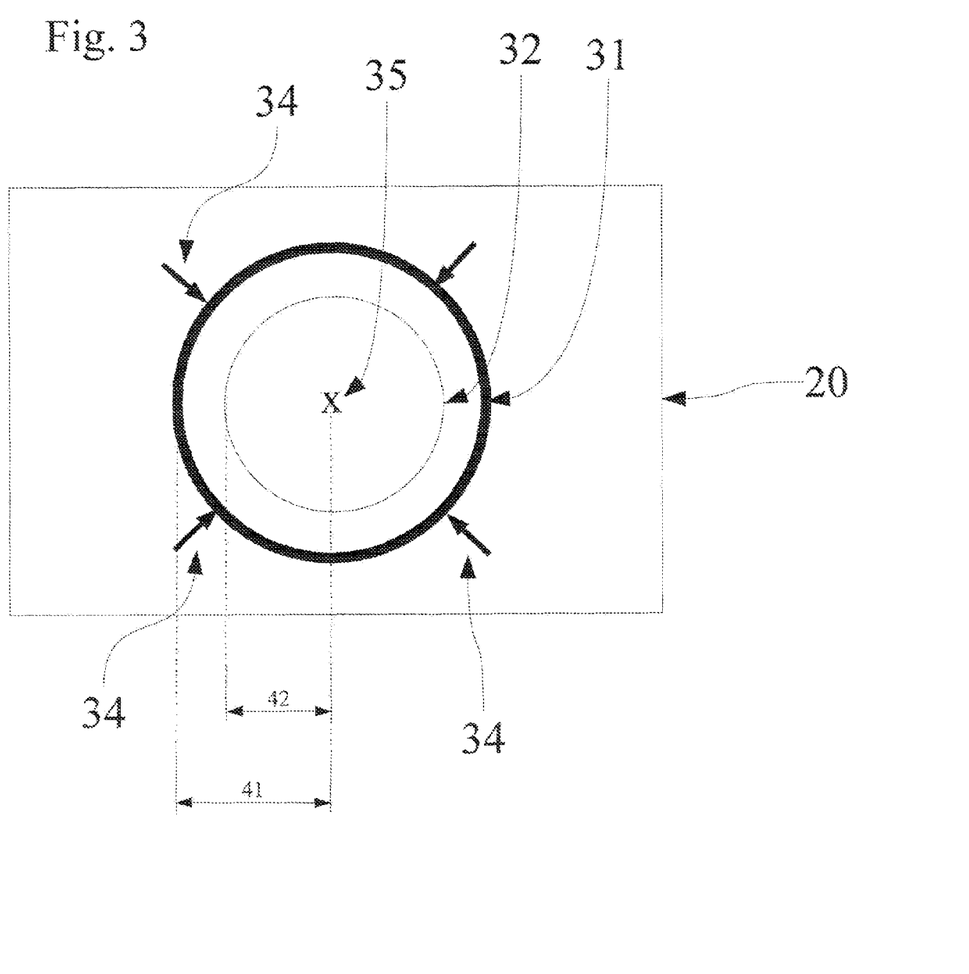
FIG. 3 shows a second way to represent locality information for display in the display device of FIG. 1, where the search apparatus is in the point-localization phase of operation and the apparatus is moving closer to the buried transmitter.
Figure 4:
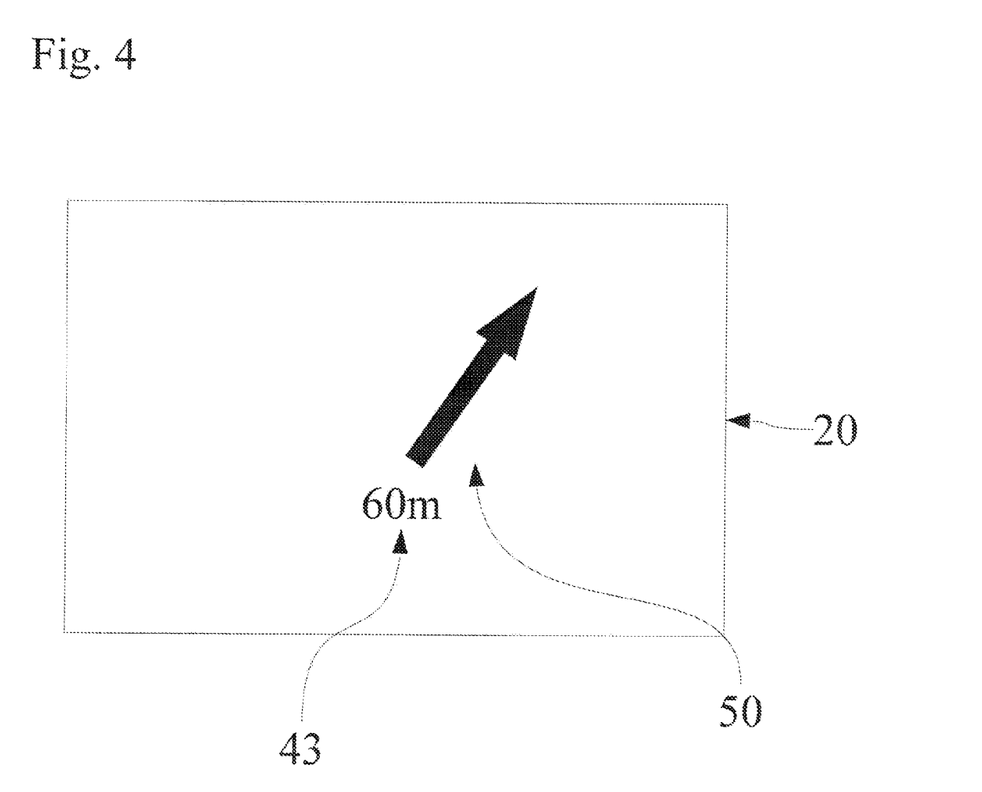
FIG. 4 shows a third way to represent locality information for display in the display device of FIG. 1, where the search apparatus is in a search phase of operation.

FIGS. 2 and 3 show a first and a second display according to the invention in the point-localization phase, where the display device 20 shows graphic symbols that represent a current distance to the buried person ("current target distance d") and a previously stored target distance. In contrast, FIG. 4 shows an example of a third display such as can be displayed in the search phase.

FIG. 2 illustrates a rectangular display that can be presented on the display device 20, on which a first distance circle 30 and a second distance circle 31 are represented. The two circles (30, 31) have a common center 35, which is situated in the middle of the rectangular display device 20. A first radius, that of the first distance circle 30, and a second radius, that of the second distance circle 31, are respectively proportional to a first target distance 40 from the buried person and a second target distance 41. The first distance circle 30 is represented by a thicker line than is the second distance circle 31, and indicates that the first target distance 40 is the current target distance d. In this particular display, the first distance circle 30 also includes a numerical representation 30a of the current target distance d, which is illustrated as being 1 meter. The second distance circle 31 has a smaller radius and symbolizes the smallest target distance ("dmin") that had previously been stored by the search appliance 10 at a time when the second target distance 41 was the current target distance d. Therefore, the searcher has at some time been closer to the buried person than at present. In the situation illustrated, the current target distance d is greater than a recent one of the previously-stored target distances, and preferably the most recent (which may or may not be the smallest target distance dmin); this shows that the search appliance 10 is moving further away from the buried person. Several first tendency arrows 33 that point away from the center 35 of the distance circles (30, 31) are displayed in this situation to indicate that the searcher is moving the search appliance 10 further away from the buried transmitter as compared to a recently reached target distance (which may be greater than dmin.) The tendency arrows 33 provide a convenient visual alert to the searcher that the searcher is moving the search appliance 10 further away from the buried person.

Another display is shown in FIG. 3, again for the situation where the search appliance 10 is operating in the point-localization phase. Here, the search appliance 10 is currently located such that the current distance d is the same as the second target distance 41, which represented on the display device 20 by the second distance circle 31. In the situation shown in FIG. 2, the display device 20 also displays a minimum distance circle 32 which represents the closet approach of the searcher to the buried person, the smallest target distance dmin; the minimum distance circle 32 is proportional to a minimum target distance 42. However, subsequent to this approach by the searcher to the distance illustrated by the circle 32, the searcher has moved to a greater distance than the second target distance 41 from the buried transmitter. The current distance circle 31 has an outline which differs in thickness from that of the minimum distance circle 32 so that the two can be readily distinguished.

As in FIG. 2, the current target distance d is larger than the minimum target distance 42 indicated by the third distance circle 32, which corresponds to the smallest target distance yet encountered, dmin. The searcher can tell from the distance circles 31 and 32 that the search appliance 10 has already been closer to the buried person at some previous time. While FIG. 2 shows a situation where the current target distance d is greater than the smallest of the stored target distances dmin, in the situation illustrated in FIG. 3 the current target distance 41 is also smaller than a recently-stored one of the target distances (not shown); preferably, the most recently-stored target distance is used for this comparison. For example, the search appliance 10 may have once been at the target distance 42 from the buried person, as indicated by the minimum distance circle 32, and has more recently been moved away until it was at the first distance 40 (shown in FIG. 2) from the buried person, greater than the current distance 41, but has now moved closer to the buried person again, and is now at the current distance 41. Thus, the current tendency of the search appliance 10 is that it is moving towards the buried person, even though it is still not as close as it was at some previous time. Several second tendency arrows 34, which here point towards the center 35, indicate that the searcher is now again tending to move the search appliance 10 to approach the buried person. As long as the inward-pointing second tendency arrows 34 are displayed, they indicate to the searcher that the search appliance 10 is moving in a proper direction to find the buried person; if the searcher begins to move the search appliance 10 further away from the buried person, warning of such will be quickly apparent when the display changes and the outward-pointing first tendency arrows 33 are displayed, as described above with regard to FIG. 2.

The examples of displays shown in FIGS. 2 and 3 having one circle representing the current target distance d and a second circle representing a lesser target distance, which in the examples illustrated is the smallest distance dmin, are helpful in interpreting the progress of the search. However, it should be appreciated that the search appliance 10 would still be functional if the display device 20 were to show only the tendency arrows (33, 34) or some other tendency indicators. In such case, the tendency indicator can provide a relative representation of the current target distance and a stored target distance by indicating whether the current target distance is less than or greater than the previously stored target distance.

In contrast to the first representation in FIG. 2 and the second representation in FIG. 3, the third representation in FIG. 4 shows a possible display to be seen on the display device 20 in the search phase. In this case, a target direction 50 and a fourth target distance 43 are indicated. The fourth target distance 43 is represented numerically in the form of a number of meters. The target direction 50, which indicates the relative direction of the buried person with respect to the long axis of the search appliance 10, is shown in the form of a directional indication.

FIGS. 5-9 are a series of illustrations showing information that might be shown on a display 100 in another example of a search conducted in the point-localization phase, with the figures showing several iterations of the search method. In this method, a comparison is provided between the current target distance d and a value for the most recent previously recorded target distance, dp; such comparison is discussed in greater detail below in the discussion of the method illustrated in FIG. 11.

Figure 5:
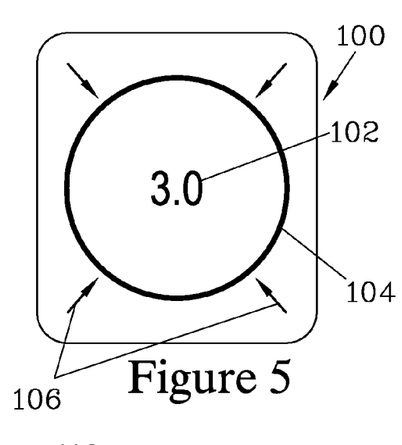
FIGS. 5-9 are a series of figures showing displays that might be provided in another example of the point-localization phase of a search.

FIG. 5 shows the display 100 when a current target distance d has just become less than a previously defined threshold distance d1. The current target distance d is represented by both a numerical indicator 102 and a current target distance circle 104. The radius of the current target distance circle 104 is proportional to d, currently 3.0M. Preferably, the numerical indicator 102 is located at the center of the current target distance circle 104.

In this example, the value for the smallest target distance dmin and a value for the most recent previous target distance, dp, were initially set equal to d1, which is greater than 3.0M. Since d is less than this initial value of dmin, dmin is reset to equal the current target distance d. The display 100 shows only the current target distance circle 104, indicating that d and dmin are equal. Thus, the single current target distance circle 104 provides both a graphic representation of the current target distance d (since its radius is proportional to d) as well as a symbolic comparison of the current target distance d to the smallest target distance dmin, indicating that these values are equal.

Four inward-pointing tendency arrows 106 are also displayed. Since d is less than the initial value of dp, the tendency arrows 106 point inward toward the center of the current target distance circle 104. The tendency arrows 106 provide a symbolic comparison of the current target distance d to the previous target distance dp, indicating that d is smaller than dp. The current target distance d is then stored as the new value for dp.

Figure 6:
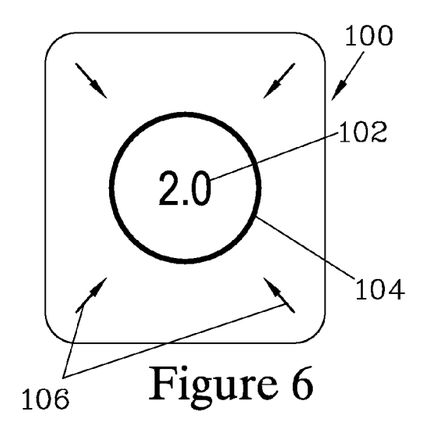

FIG. 6 shows the display 100 when the searcher has moved the receiver closer to the buried transmitter, such that the current target distance d is now 2.0M. This value is displayed on the numerical indicator 102, and the current target distance circle 104 is smaller in size to remain proportional to the current target distance d. The current target distance d is compared to the current value for dmin, which was set at 3.0M in the previous iteration, and since the current target distance d is smaller, dmin is again reset equal to the current target distance d, now 2.0M. Again, since d and dmin are the same, the current target distance circle 104 is the only circle displayed. The current target distance d is also smaller than the previously stored target distance dp, (also set at 3.0M), and again the inward-pointing tendency arrows 106 are displayed to indicate this comparison.

Figures 7, 8:
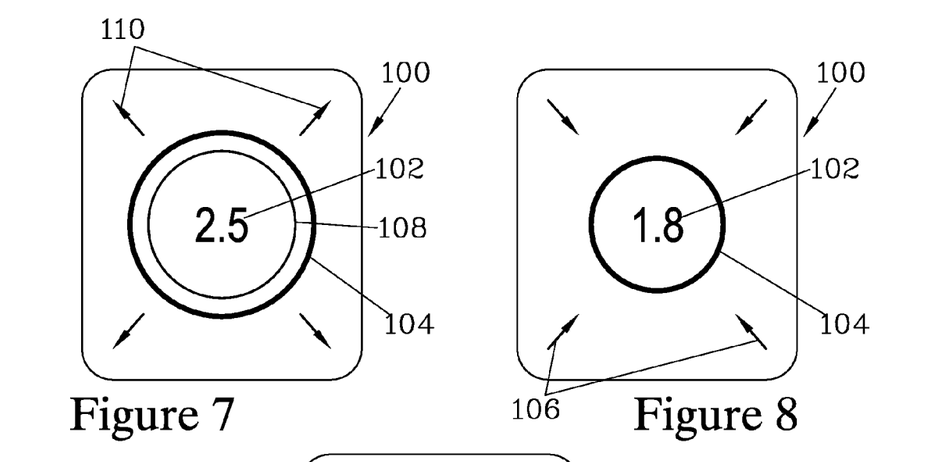

FIG. 7 shows the display 100 where the searcher has moved the receiver to a current target distance d of 2.5M. Again, the current target distance d is shown on the numerical indicator 102 and is represented by the size of the current target distance circle 104. Since d is now greater than dmin (set at 2.0M in the previous iteration), the display 100 now shows both the current target distance circle 104 and a minimum target distance circle 108 that is proportional in size to dmin and is concentric with the current target distance circle 104. The display of the minimum target distance circle 108 provides a symbolic comparison of the current target distance d to the smallest target distance dmin, indicating that the current target distance d is greater than dmin. To readily distinguish the current target distance circle 104 from the minimum target distance circle 108, the current target distance circle 104 is substantially thicker; however, it should be noted that in the example shown in FIGS. 5-9, whenever two circles (104, 108) are displayed, the outer one will always be the current target distance circle 104.

The current target distance d in this iteration is also greater than the immediately previous target distance dp, which was also set at 2.0M in the previous iteration. To provide a symbolic comparison of the current target distance d to the previously stored target distance dp, outward-pointing tendency arrows 110 are displayed, which point away from the center of the current target distance circle 104.

FIG. 8 shows the display 100 where the searcher is again approaching the buried transmitter, and has brought the receiver to a current target distance d of 1.8M. The current target distance d is smaller than dmin (still set at 2.0M), so dmin is set equal to d, and again the current target distance circle 104 is the only circle displayed. The minimum target distance circle 108 is not shown, as the current target distance circle 104 is superimposed thereon. The current target distance d is also smaller than the previously stored target distance dp (set at 2.5M), so the inwardly-pointing tendency arrows 106 are also displayed.

Figure 9:
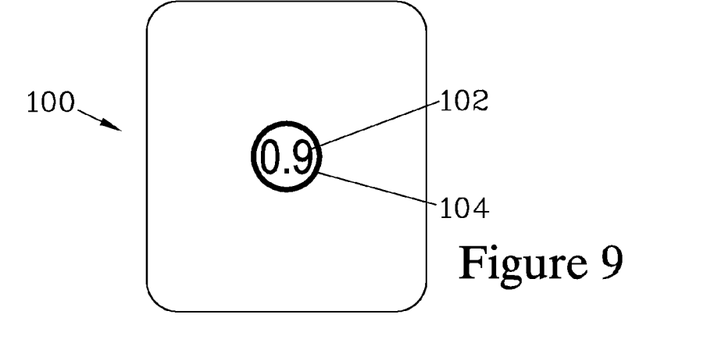

FIG. 9 shows the display 100 where the searcher has moved close enough that the current target distance d is less than a second threshold distance d2. This distance is sufficiently close that the searcher should begin physically searching for the buried person by digging and/or probing the ground surface; in the example illustrated, this minimum distance d2 is set at 0.9M. To indicate this situation, the display shows only the numerical indicator 102 and the current target distance circle 104, without the tendency arrows (106, 110).

Figure 10:
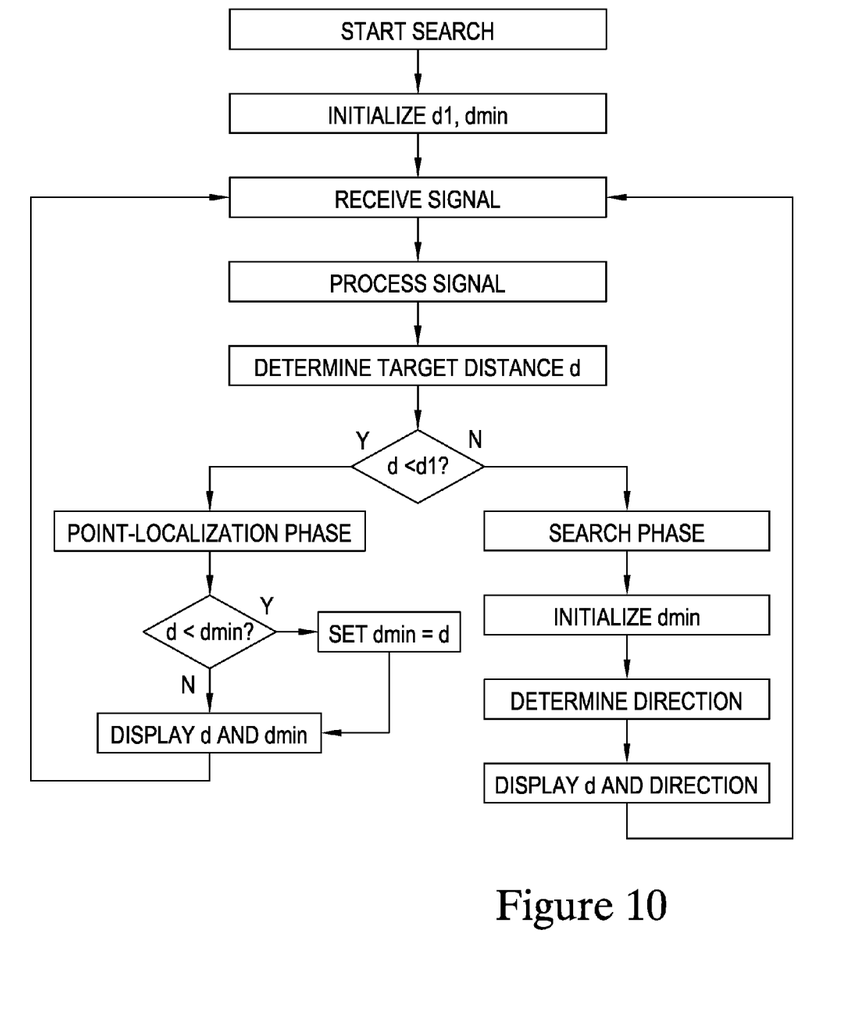
FIG. 10 is a flow chart for a method of locating a buried person, comprising a search phase and a point-localization phase.

As discussed above, the search appliance 10 shown in FIG. 1 discriminates with discriminating means 22 between the point-localization phase and the search phase to determine which phase is currently appropriate. The complexity of the scheme for making the selection and the display of the information obtained during the search will depend, in part, on the search data to be presented on the screen. The flow diagram in FIG. 10 is for a situation where the display is limited, in the search phase, to presenting the target distance and the direction of the buried person relative to the search appliance 10, and in the point-location phase, to displaying the current target distance d and the minimum stored target distance dmin. The flow diagram shown in FIG. 10 illustrates the steps for this scheme. Specifically, in a first step of the process, the search is started, which can be done with the actuation device 23 such as is illustrated in FIG. 1. Thereafter, an initialization of, the variables dmin (smallest target distance) and d1 (predetermined target-distance threshold) is done; these functions can also be provided by the actuation device 23. It is convenient for the initial value of dmin to be set the same as d1, since this will be the maximum target distance when the search appliance 10 is moved to the point where the operation switches from the search phase to the point-localization phase.

In the next steps, the signal transmitted by a transmitter carried by a buried person is received and processed, by a receiver 11 and a processing device 12, respectively, which form part of the search appliance 10. The processing device 12 uses the processed signal to establish a current target distance d. The determination of distance from buried transmitter based on signal strength using one or more antennas is known in the art; frequently, the signals as received by multiple antennas are processed to provide a more accurate value for the distance, as well as to orient the search appliance with regard to the buried transmitter. The value of the current target distance d is compared, by the discrimination means 22, with the target-distance threshold d1. If the target distance d is larger than d1, then the discrimination means 22 directs that the signal received is to be further analyzed in the search phase. In the search phase, dmin is reinitialized by the processing device 12 to assure that, if the search has previously been conducted in the in the point-localization phase, the initialized value of dmin is restored. It should be noted that other schemes could be employed to eliminate the necessity of reinitializing at each pass through the search phase. Next in the search phase, a determination of the orientation of the buried transmitter with respect to the appliance is made with the signal processing device 12 and the representations of the orientation and the distance are directed to the display device 20 via the control means 21.

When the current target distance d is smaller than the target-distance threshold value d1, indicating that the searcher is relatively close to the buried person, the discrimination means 22 causes the steps of the point-localization phase to be executed under this condition. If this condition is not met at some subsequent time, then the discrimination means 22 decides to again implement the search phase. To prevent unnecessary switching between the two phases when the search appliance is located at the distance d1, the value of d1 can be increased when the point-localization phase is implemented, as discussed below with regard to FIG. 11.

In a first step of the point-localization phase, the current target distance d is compared with a minimal target distance dmin with the discriminating means 22. The minimal target distance dmin has been appropriately initialized and stored in memory residing in storage device 13 at the outset of the search and/or in the search phase. If the current target distance d is smaller than the minimal target distance dmin, the value of the minimal target distance dmin is set equal to the value of the target distance d and stored in the memory residing in the storage device 13. In this manner, the stored target distance that corresponds to the smallest stored target distance, either the current target distance or the target distance previously found to be smaller, is determined to be the new value for the minimum target distance dmin. Regardless of whether the current target distance d is smaller than the minimal target distance dmin, in a final step both target distances dmin and d are formatted and sent to the display 20 by the control means 21. If the d and dmin are the same and are represented on the display 20 by graphic symbols, such as distance circles such as shown in FIGS. 2 and 3, the circles will superimpose. While some method of distinguishing the two images such as discussed above could be employed to remind the searcher that there are two circles, such is not necessary since a single circle could be used to indicate the searcher is approaching the target. In the case where d and dmin are different, the display 20 will show both circles and appear similar to the displays shown in FIGS. 2 and 3 to provide notice that the searcher is not as close to the target as previously in the search; however, the method illustrated in FIG. 10 does not provide steps that will allow showing tendency indicators.

After completing the steps of the point-localization phase or the search phase and the searcher has moved the search appliance 10 in response to the information displayed on the display device 20, the signal received from the buried transmitter will change, and the steps described above are repeated until the buried person has been found.

Figure 11:
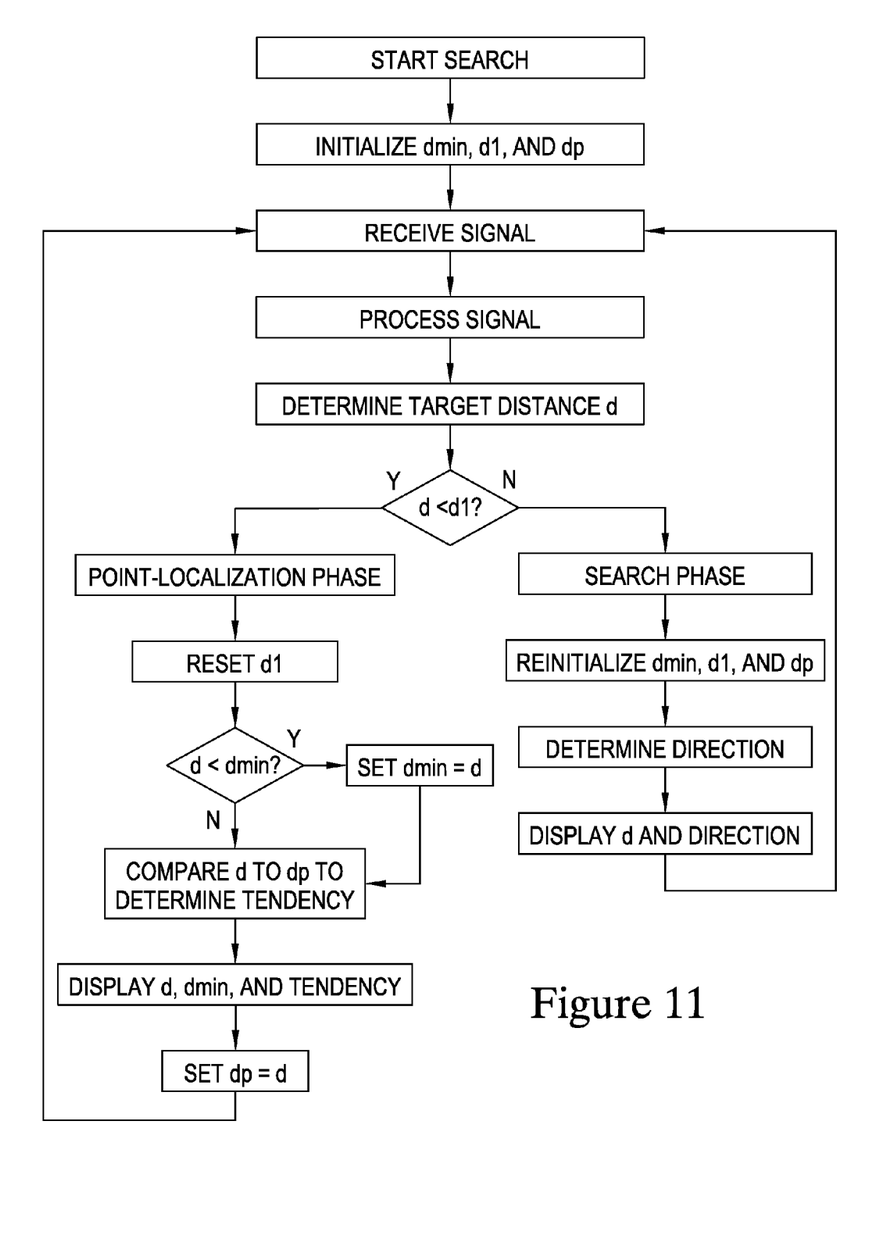
FIG. 11 is a flow chart for another method of locating a buried person, where the point-localization phase includes a comparison of the current target distance to the immediately previously stored target distance.

FIG. 11 is a flow diagram for another method of using an apparatus of the present invention, such as the search appliance 10 shown in FIG. 1, where the apparatus utilizes additional storage capacity to allow an additional past value to be stored which, for this example, is the immediate past value of the target distance, dp. With the use of this additional information, one can better characterize the tendency of the search to provide additional graphic information to indicate to the searcher whether the apparatus is moving closer to or further away from the buried transmitter. This method also provides protection against the system from undue cycling in an out of the point-location phase. For purposes of discussion, the method is described below as employing the search appliance 10 shown in FIG. 1.

For this method, the search is started in a manner similar to the search illustrated and discussed in FIG. 10. It differs in that, in addition to initializing dmin and d1, it also initializes dp, the value for the previous iteration of the target distance d. This value for dp can be an arbitrary value when initialized, which will allow the calculation of the tendency to be started, however the first iteration of the tendency must be ignored if shown; it may be most practical to set the initial value of dp the same as d1 and dmin. In any case, as the search progresses, the value of dp stored in the memory of the storage device 13 will be the current distance value d of the previous iteration of the search. In the search phase, the steps of this particular method are the same as the previous example of the method discussed above and represented by the flow chart of FIG. 10, with the step of reinitializing the stored values changing dmin, d1, and dp. Thus, if the search appliance 10 has been in the point-localization phase and moves far enough from the buried transmitter to switch to the search phase, the stored target distances dp and dmin, and the threshold distance d1 in the memory of the storage device 13 are over written and are returned to their original values, and this assures that the threshold value d1 is returned to its original value after being reset in the point-localization phase, as discussed below.

When the current target distance d becomes less than d1, the discrimination means 22 causes the point-localization phase to be employed. In the method illustrated in FIG. 11, the threshold distance d1 is reset to a value somewhat greater than its original value; this prevents continual jumping back and forth between point-localization phase and search phase during the initial part of the point-localization phase. In the point-localization phase, the current target distance d is compared to dmin and, if less than dmin, d replaces the stored dmin in the memory of the storage device 13. A comparison is also made between d and dp (for the first iteration, the initial value of dp, based on either the initialization or the reinitialization, is employed). A tendency is determined based on whether d is smaller than dp, thus indicating that the search appliance 10 is moving closer to the buried transmitter, or is larger than dp, indicating that the search appliance 10 is moving further away from the buried transmitter. In this particular embodiment of the method, the control means 21 drives the display device 20 to show representations of d, dmin and the tendency, and thus provides a display similar to those shown in FIGS. 5 through 8. While dp is not explicitly displayed, the display of the tendency provides a relative display of dp as compared to d.

The method continues with the current target distance d replacing the stored value for dp, and then again receiving the signal from the buried transmitter to process to provide a new value for the current target distance d.

The search process continues until the searcher is close enough to the buried person to begin physically searching. It is preferred to provide a notice to the searcher when the buried transmitter is sufficiently close, such as by providing an indication as discussed above with regard to the description of FIG. 9. When such notice is to be provided, the search method includes the additional steps (not shown) of comparing the current target distance d to a predetermined minimum search distance d2 and, if d is found to be less than d2, providing notice to the searcher. Such notice could be done by changing the display shown on the display device 20, as discussed above, or by other means, such as providing an audio signal when the search appliance 10 is configured to provide such.

While the novel features of the present invention have been described in terms of particular embodiments and preferred applications, it should be appreciated by one skilled in the art that substitution of materials and modification of details obviously can be made without departing from the spirit of the invention.

| List of reference numerals | |
|---|---|
| 10 | Search appliance for finding people buried by avalanches |
| 11 | Receiver |
| 12 | Processing device |
| 13 | Storage device |
| 14 | Deletion device |
| 20 | Display device |
| 21 | Control means |
| 22 | Discrimination means |
| 23 | Actuation device |
| 30-32 | Distance circle |
| 33-34 | Tendency arrow |
| 35 | Center |
| 40-43 | Target distance |
| 50 | Target direction |
| d | Current target distance |
| dmin | Smallest target distance |
| d1 | Target-distance threshold value |
| dp | the value of d for the previous cycle |

I claim:

1. A method of finding a person who has been buried alive by means of a wireless receiver with a directional characteristic, which employs a search phase when received signal strength, such received signal strength corresponding to a current target distance d between the receiver and a transmitter carried by the buried person, is less than the signal strength corresponding to a predefined threshold distance d1, and which employs a point-location phase when the received signal strength for the current target distance d is greater than the signal strength corresponding to the predefined threshold distance d1, the method comprising the steps of:
    reception, by the wireless receiver, of signals transmitted from a wireless transmitter belonging to the buried person,
    processing of the received signals to determine the current target distance d,
    comparing the processed signal for the determined current target distance d to the signal corresponding to the predefined threshold distance d1 and when the signals indicate,
        d>d1, employing a search phase including display of information related to the location of the buried person,
        d<d1, employing a point-localization phase, wherein the point-localization phase includes repeatedly carrying out the following steps:
            storing the current target distance d and
            displaying a representation of the current target distance d as well as a symbolic comparison of the current target distance d to at least one target distance that was previously received and stored.

2. The method of claim 1 wherein the display, in the point-localization phase, comprises the display of at least one graphic symbol.

3. The method of claim 2 wherein the display, in the point-localization phase, comprises the display of at least one first graphic symbol for representing the current target distance d and at least one second graphic symbol for representing the at least one previously-stored target distance, the at least one first graphic symbol differing visually from the at least one second graphic symbol such that the symbols for representing the current target distance d can be distinguished from those for representing the previously-stored target distance.

4. The method of claim 3 wherein at least one of the first graphic symbols consists of at least a portion of a first distance circle with a radius that is related to the current target distance d.

5. The method of claim 4 wherein at least one of the second graphic symbols consists of at least a portion of a second distance circle with a radius that is related to a previously-stored target distance.

6. The method of claim 3 wherein the at least one second graphic symbol indicates a tendency that represents the relative size of the at least one previously-stored target distance compared to the current target distance d.

7. The method of claim 2 wherein the at least one graphic symbol includes at least one graphic symbol that indicates a tendency that represents the relative size of the at least one previously-stored target distance compared to the current target distance d.

8. The method of claim 1 further comprising the additional steps of:
    in the point-localization phase, redefining the threshold distance d1 to a larger value; and
    in the search phase, reinitializing the threshold distance d1 to its original value.

9. The method of claim 6 further comprising the additional steps of:
    defining a minimum distance threshold value d2;
    in the point-localization phase, comparing the current distance value d to the minimum distance threshold value d2; and
    if d<d2, providing an indication of such to the searcher.

10. The method of claim 5 further comprising the steps of:
    storing an initial default value for a smallest target distance dmin;
    in the point-localization phase,
        comparing the current target distance d to the smallest target distance dmin;
        if d<dmin, resetting the stored value of dmin=d; and
        if d>dmin, displaying the at least a portion of the second distance circle where the second distance circle has a radius that is related to said smallest target distance dmin.

11. An apparatus for finding people who have been buried by avalanches, the apparatus being operable in a search phase and a point-localization phase and comprising:
    a receiver with a directional characteristic, to receive signals transmitted by a buried person;
    a processing device for analyzing the received signals and determining current locality information including, at least, a current target distance separating said receiver from the buried person;
    a display device to display said locality information;
    a control means for driving said display device,
        wherein said control means has means for providing a comparison between said current target distance and at least one target distance that was previously stored, which functions when operating in the point-localization phase;
    a discrimination means that discriminates between the search phase and the point-localization phase based on said current target distance and changes operation of the apparatus from one phase to the other in accordance with said current target distance; and
    a storage device having addressable memory for storing at least one item of locality information.

12. The apparatus of claim 11 wherein said discrimination means is designed so that it changes operation from search phase to point-localization phase when said current target distance is smaller than a prespecified distance value and further wherein said discrimination means is designed so that it changes operation from the point-localization phase to the search phase when said current target distance is larger than said prespecified distance value.

13. The apparatus of claim 12 wherein said control means drives said display device in such a way that said display device, in the point-localization phase, displays at least one graphic symbol.

14. The apparatus of claim 13 wherein said control means drives said display device in such a way that said display device, in the point-localization phase, displays at least one first graphic symbol for representing said current target distance and at least one second graphic symbol for representing said at least one previously-stored target distance, said at least one first graphic symbol differing visually from said at least one second graphic symbol such that said symbols for representing said current target distance can be distinguished from those for representing said previously-stored target distance.

15. The apparatus of claim 14 wherein at least one of said first graphic symbols comprises at least a portion of a distance circle with a radius that is related to said current target distance.

16. The apparatus of claim 15 wherein at least one of said second graphic symbols comprises at least a portion of a distance circle with a radius that is related to said previously-stored target distance.

17. The apparatus of claim 14 wherein said at least one second graphic symbol indicates a tendency that represents the relative size of said at least one previously-stored target distance compared to said current target distance.

18. The apparatus of claim 15 wherein said at least one second graphic symbol comprises at least one tendency arrow that indicates the relative size of said at least one previously-stored target distance compared to said current target distance.

19. The apparatus of claim 12 wherein said discrimination means is designed so that, in the point-localization phase when said current target distance is smaller than a prespecified minimum distance value, said control means drives said display device to display a notification of such condition.

* * * * *